(12) United States Patent
Yalakanti et al.

(10) Patent No.: US 10,769,218 B2
(45) Date of Patent: Sep. 8, 2020

(54) DISPLAY FOR NETWORK TIME SERIES DATA WITH ADAPTABLE ZOOM INTERVALS

(71) Applicant: HEWLETT PACKARD ENTERPRISE DEVELOPMENT LP, Houston, TX (US)

(72) Inventors: Ramachandra Yalakanti, Roseville, CA (US); Seetharam Pranihith Venuturupalli, Roseville, CA (US); Kevin Tajeran, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 160 days.

(21) Appl. No.: 16/010,070

(22) Filed: Jun. 15, 2018

(65) Prior Publication Data

US 2019/0384858 A1 Dec. 19, 2019

(51) Int. Cl.
| | |
|---|---|
| *G06F 15/16* | (2006.01) |
| *G06F 16/951* | (2019.01) |
| *H04L 12/24* | (2006.01) |
| *G06F 16/9032* | (2019.01) |
| *H04L 29/08* | (2006.01) |

(52) U.S. Cl.
CPC ........ *G06F 16/951* (2019.01); *G06F 16/9032* (2019.01); *H04L 41/0631* (2013.01); *H04L 41/5038* (2013.01); *H04L 41/064* (2013.01); *H04L 67/36* (2013.01)

(58) Field of Classification Search
CPC ............................. H04L 67/36; H04L 41/064
See application file for complete search history.

(56) References Cited

U.S. PATENT DOCUMENTS

| 6,061,724 A * | 5/2000 | Ries ................... G06F 11/3447 709/223 |
| 7,310,590 B1 * | 12/2007 | Bansal ................ G06F 11/0715 702/181 |
| 9,166,895 B1 * | 10/2015 | Sivaraman .......... G06F 11/3409 |
| 9,819,565 B2 | 11/2017 | Djukic et al. |
| 2004/0133395 A1 * | 7/2004 | Ding ................... G06F 11/3452 702/182 |
| 2006/0168208 A1 * | 7/2006 | Nagami .............. H04L 41/0893 709/224 |
| 2006/0276995 A1 * | 12/2006 | Breitgand ............... H04L 41/00 702/179 |

(Continued)

*Primary Examiner* — Hieu T Hoang
(74) *Attorney, Agent, or Firm* — Hewlett Packard Enterprise Patent Department

(57) ABSTRACT

A method that includes receiving, from a client device, a pre-selected period of time, and determining whether multiple data values corresponding to the pre-selected period of time exceeds a threshold permitted by a network service request is provided. The method includes determining an interval at which the network service request is made based on the pre-selected period of time, and constructing a query that requests the data values with a constraint, wherein the constraint reduces the data values corresponding to the pre-selected period of time to a subset of data values that preserve a data quality. The method also includes making the network service request using the query and displaying results received in a response to the network service request.

16 Claims, 9 Drawing Sheets

(56) References Cited

U.S. PATENT DOCUMENTS

| | | | |
|---|---|---|---|
| 2006/0293777 A1* | 12/2006 | Breitgand | H04L 43/16 |
| | | | 700/108 |
| 2013/0289927 A1* | 10/2013 | Smith | G06Q 10/0832 |
| | | | 702/130 |
| 2015/0205690 A1* | 7/2015 | Seto | G06F 11/3466 |
| | | | 702/182 |
| 2015/0281006 A1 | 10/2015 | Kasturi et al. | |
| 2015/0347528 A1* | 12/2015 | Jugel | G06F 16/24535 |
| | | | 707/759 |
| 2016/0218948 A1* | 7/2016 | Djukic | H04L 43/0876 |
| 2016/0292300 A1* | 10/2016 | Bhatia | H04L 45/48 |
| 2017/0185797 A1* | 6/2017 | Valine | G06F 21/6227 |
| 2018/0246941 A1* | 8/2018 | Salunke | G06F 16/24552 |
| 2018/0365298 A1* | 12/2018 | Poghosyan | G06K 9/6284 |
| 2019/0065563 A1* | 2/2019 | Petculescu | G06F 16/248 |

\* cited by examiner

US 10,769,218 B2

DISPLAY FOR NETWORK TIME SERIES DATA WITH ADAPTABLE ZOOM INTERVALS

BACKGROUND

Network administrators typically spend large amounts of time finding the root cause of a network problem by looking into conventional logs, system logs, network management tools, and by running command-line interface (CLI) commands to query current network status. When a network administrator decides to alter the time scale of a display (e.g., zoom-in, zoom-out in time), adjusting the resolution can result in the display of unwanted data, which may be of limited help to the user or even misleading, in some cases. Moreover, in current applications, plotting millions of data points on a mobile device is not a scalable procedure, and a single graphical display of the value of a network resource may saturate the networking capacity of the mobile device itself.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
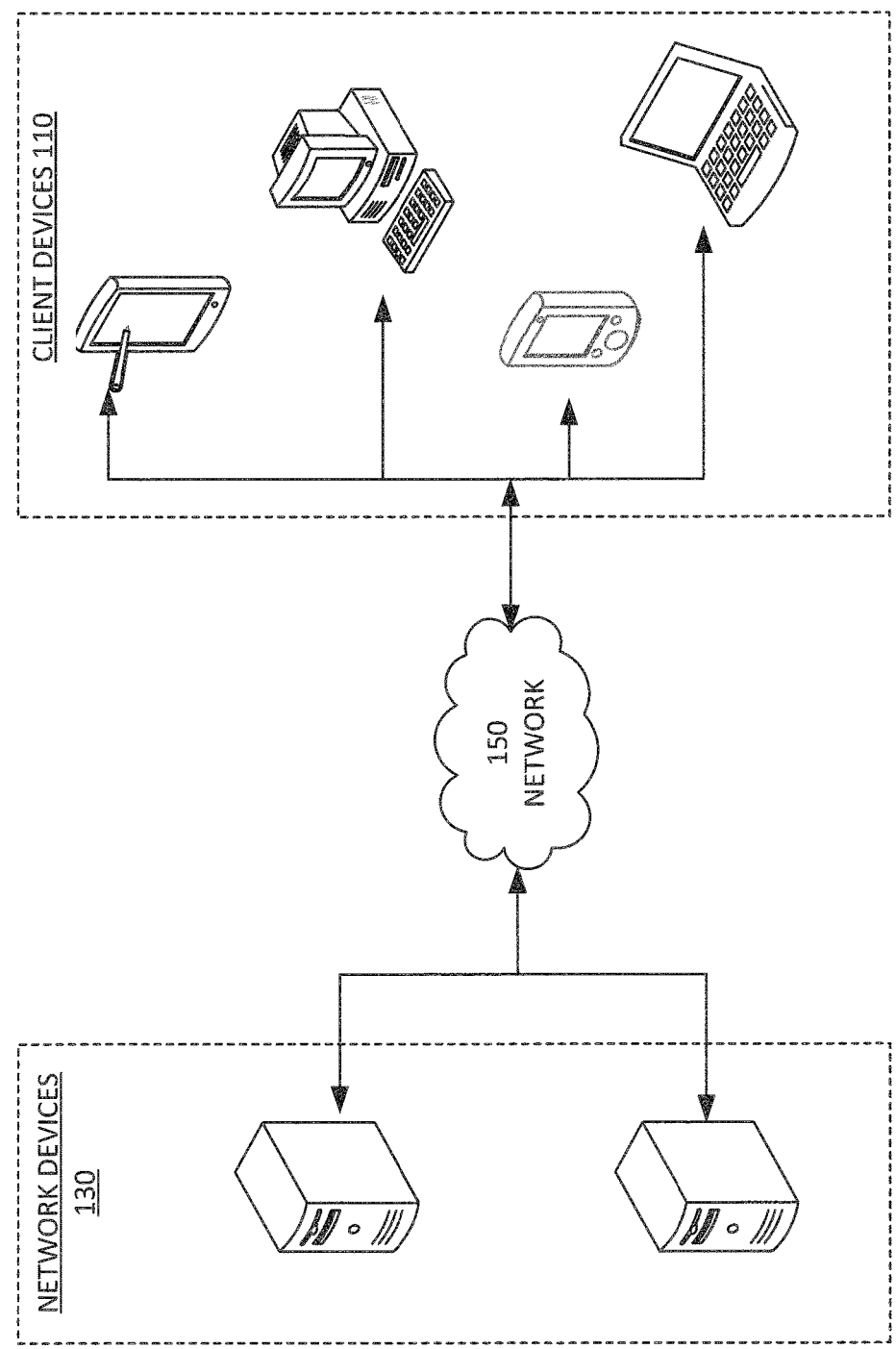
FIG. 1 illustrates an example architecture suitable for displaying network time series data with adaptable zoom intervals, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

The present disclosure addresses the problem arising in computer technology wherein large data sets collected over extended periods of time are scanned and analyzed efficiently to find relevant events, patterns, or indicators that signal an undesirable occurrence or a correctible behavior of a network node. This is achieved by dynamically adjusting a time interval to select a number of data values, and constructing a query that requests the number of data values with a pre-defined constraint. Embodiments as disclosed herein provide a visual representation of relevant network events across multiple zooming ranges of time intervals with minimal network calls to retrieve data, thus reducing network traffic and avoiding performance bottlenecks. Further, embodiments as disclosed herein enable a user to visualize network data and network performance remotely and seamlessly, without a performance constraint imposed from a mobile device host.

Embodiments as disclosed herein enable network administrators to monitor in real-time a node performance in a reduced period of time, and combine results from different query commands to determine trends, patterns and correlations with a limited number of network calls.

Embodiments as disclosed herein resolve the problem in network based computer technology for providing simple and relevant data to a network administrator that may desire to access a network device remotely, using a client device. Accordingly, methods and systems disclosed herein may reduce substantially the amount of data exchanged between a client device used by a network administrator and a network device being diagnosed by the network administrator. This allows the network administrator to quickly browse through complex information and determine a specific network event.

The proposed solution further reduces the bandwidth usage and the resource allocation for such maintenance tasks, thereby improving the performance of the network device within a given network configuration.

Some embodiments substantially reduce the long delays in finding a root problem in a network, where real-time analysis is essential in a critical business environment. Traditional approaches involving the plot of a large number of data points can quickly become confusing and time-consuming. In some embodiments, a system as disclosed herein automatically detects and adjusts a time resolution (e.g., step size) based on a time-zoom range selected by a network administrator. Some embodiments provide data and preserve a data quality by summarizing and aggregating raw data points. In embodiments as disclosed herein a network administrator can view longer time intervals on small-scale devices like mobile devices, tablets, smart-phones, and the like. Embodiments as disclosed herein reduce significantly the network calls from a mobile device used by a network administrator, thus avoiding network traffic and performance bottlenecks.

In one embodiment of the present disclosure, a computer-implemented method is described for receiving, from a client device, a pre-selected period of time. The computer-implemented method includes determining whether multiple data values corresponding to the pre-selected period of time exceeds a threshold permitted by a network service request, determining an interval at which the network service request is made based on the pre-selected period of time, and constructing a query that requests the data values with a constraint, wherein the constraint reduces the data values corresponding to the pre-selected period of time to a subset of data values that preserve a data quality. The computer-implemented method also includes making the network service request using the query, and displaying results received in a response to the network service request.

According to one embodiment, a system is described that includes a memory storing instructions and one or more processors configured to execute the instructions to receive, from a client device, a pre-selected period of time. The one or more processors also execute instructions to determine whether multiple data values corresponding to the pre-selected period of time exceeds a threshold permitted by a network service request, to determine an interval at which the network service request is made based on the pre-selected period of time, and to construct a query that requests the data values with a constraint, wherein the constraint reduces the data values corresponding to the pre-selected period of time to a subset of data values that preserve a data quality. The one or more processors also execute instructions to make the network service request using the query, and to display results received in a response to the network service request.

According to one embodiment, a non-transitory, machine readable medium is described that includes instructions, which when executed by one or more processors, cause a computer to perform a method, the method including receiving, from a client device, a pre-selected period of time. The method also includes determining whether multiple data values corresponding to the pre-selected period of time exceeds a threshold permitted by a network service request, determining an interval at which the network service request is made based on the pre-selected period of time, and constructing a query that requests the data values with a constraint, wherein the constraint reduces the data values corresponding to the pre-selected period of time to a subset of data values that preserve a data quality. The method also includes making the network service request using the query and displaying results received in a response to the network service request.

In yet other embodiment, a system is described that includes a means for storing commands and a means for executing the commands causing the system to perform a method that includes receiving, from a client device, a pre-selected period of time. The method includes determining whether multiple data values corresponding to the pre-selected period of time exceeds a threshold permitted by a network service request, determining an interval at which the network service request is made based on the pre-selected period of time, and constructing a query that requests the data values with a constraint, wherein the constraint reduces the data values corresponding to the pre-selected period of time to a subset of data values that preserve a data quality. The method also includes making the network service request using the query, and displaying results received in a response to the network service request.

In one embodiment, a computer-implemented method as disclosed herein includes selecting, from a network analysis engine dashboard, an agent for displaying data associated with a network device. The computer-implemented method also includes selecting a first period of time for a display of multiple data values associated with the agent, requesting an event identifier from the agent, identifying a correlation between multiple events based on the event identifier; and adjusting a parameter in a network device based on the correlation.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

FIG. 1 illustrates an example architecture 10 for deployment of a network device-less application in a cloud computing environment. Architecture 10 includes, network devices 130 and client devices 110 connected over a network 150. One of the many network devices 130 is configured to host a memory including instructions which, when executed by a processor, cause the network device 130 to perform at least some of the steps in methods as disclosed herein. In some embodiments, the processor is configured to perform an application running in one or more of client devices 110. For purposes of load balancing, multiple network devices 130 can host memories including instructions to one or more processors to perform an instance of one of multiple functions to complete the application.

Network devices 130 may include any device having an appropriate processor, memory, and communications capability for communicating with client devices 110. Any one of network devices 130 may be accessible by various client devices 110 over network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing the network device application in one or more of network devices 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Architecture 10 enables cloud providers to provide performance guarantees for network device applications. This helps to increase revenue by enabling a differentiated service which leads to more customers and enables optimal app placement which in turn results in efficient resource usage, saving energy and usage costs for the cloud provider. Also, Architecture 10 enables accountability for the cloud provider thus fulfilling the goal of network device computing where cloud providers rather than customers are accountable for application performance. Accordingly, embodiments as disclosed herein include more reliable network device provider and enable declarative management for applications, that is, the customer or developer of the app only needs to declaratively specify the app performance policy or intent and the cloud provider handles the policy implementation using our embodiment. Thus, simplifying things for the customer.

Architecture 10 allows distributed deployment of functions in applications so that a distributed topology of network devices 130 is efficiently utilized while maintaining app performance-based service level agreements. Architecture 10 allows customers to estimate and limit their usage costs by writing performance-based service level agreements that take into account the fine-grained, pay-as-you-go for the resources you are using model of network device computing. Architecture 10 is able to handle the uncertain nature of network device computing and maintains app performance-based service level agreements by continuously monitoring the cloud state and re-orchestrating applications when needed. In some embodiments, architecture 10 uses probabilistic programming as policy specification language which is a natural fit for probabilistic policy specification in network device computing, thus simplifying the specification task for developers.

Figure 2:
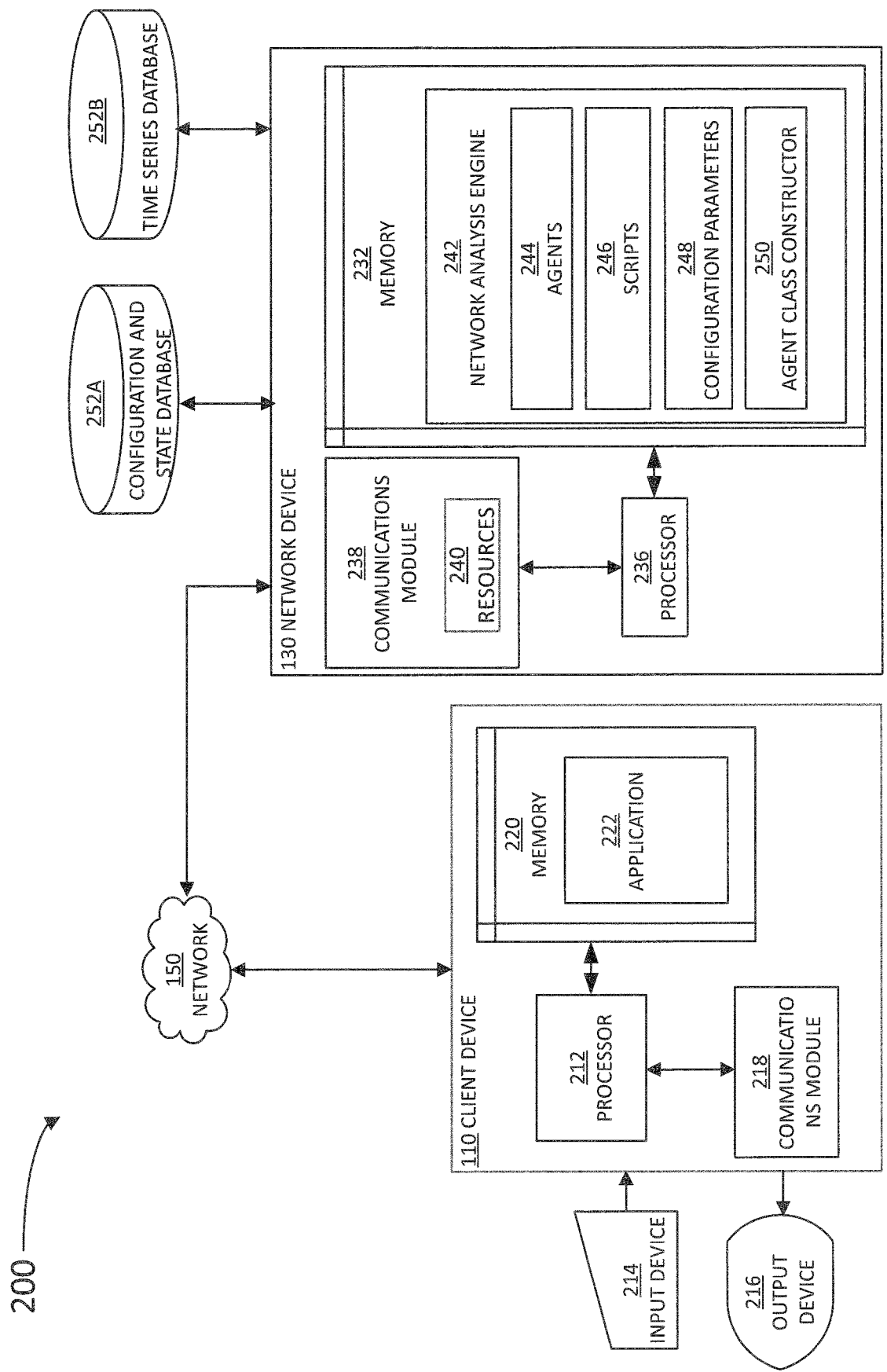
FIG. 2 is an architecture illustrating an example network device and client from the architecture of FIG. 1, according to certain aspects of the disclosure.

FIG. 2 is a network architecture 200 illustrating an example network device 130 and client device 110 in the architecture 10 of FIG. 1, according to certain aspects of the disclosure. Client device 110 and network device 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards. Client device 110 may also be coupled with an input device 214 and an output device 216. Input device 214 may include a mouse, a keyboard, a touchscreen and the like. Output device 216 may include a display, a touchscreen, a microphone, and the like. In some embodiments, input device 214 and output device 216 may be included in the same unit (e.g., a touchscreen).

Network device 130 includes a memory 232, a processor 236, and communications module 238. Network device 130 may be any device used to handle data communication in a network, e.g., a node, a switch, a multiplexer, a router, an access point. In that regard, network device 130 may include any one of a wired terminal (e.g., a copper cable, a fiber optic cable), or a wireless terminal (e.g., Wi-Fi, Bluetooth, cellular network, and the like), or any combination thereof. Processor 236 is configured to execute instructions, such as instructions physically coded into processor 236, instructions stored in memory 232, or a combination of both. In some embodiments, an application 222 in client device 110 may be installed by network device 130 and perform scripts and other routines provided by network device 130. Execution of application 222 may be controlled by a processor 212 in client device 110. Communications module 238 may include resources 240, which are hardware and software components that enable the operation of network device 130 within a network. Resources 240 may include input ports and output ports, buffers, first-in, first-out (FIFO) registers, serializer-de-serializer circuits (SERDES), multiplexers and the like.

Memory 232 includes a network analysis engine 242 configured to receive requests from a user for performance parameters of the network device. Network analysis engine may include agents 244, scripts 246, configuration parameters 248, agent class constructor 250, among other components. In some embodiments, network analysis engine 242 supports micro service extension capabilities to troubleshoot network device 130, including specific business-critical applications. In some embodiments, network analysis engine 242 includes a python sandbox with full access to databases 252.

Configuration parameters 248 include parameters used in the configuration of network device 130 and other relevant information for the maintenance and operation of network device 130. In some embodiments, at least one of configuration parameters 248 instructs agents 244 to periodically monitor a performance of at least one resource in network device 130. For example, in some embodiments to provide a requested value of a system resource or perform any other monitoring function (as determined by scripts 246) every five seconds, or even faster. In some embodiments, one of configuration parameters 248 is configured to retrieve a packet throughput of at least one input/output port in network device 130.

Network analysis engine 242 also includes an agent class constructor 250 which includes monitors to define a resource in network device 130 to be monitored by an agent 244, and rules defining conditions that reference multiple monitors, or any other condition to be satisfied between different monitors. Each script 246 can have multiple monitors, which can specify aggregation functions (sum, min, max over time, and the like). Below is an example script 246 for configuring an agent 244 with "sum over time" aggregation functions:

```
ParameterDefinitions = {
'poll_interval': {
'Name': 'Poll Interval of CPU',
'Description': 'Monitoring Resource Utilization Poll Interval',
'Type': 'integer',
'Default': 80}}
class Policy(NAE):
def __init__(self):
self.logger.setLevel(INFO)
self.logger.info('Policy { } with id { } is
initializing'.format(self.display_name( ), self.id( )))
uri1 = '/rest/v1/system?attributes=resource_utilization_poll_interval'
resource_poll = SumOverTime(uri1, "5 minutes")
self.m1 = Monitor(resource_poll, name = 'Resource Utilization Poll
Interval')
self.r1 = Rule('Resource Utilization Poll Interval')
self.r1.condition('{ } > { }', [self.m1, self.params['poll_interval']])
self.r1.action(self.action_callback)
def action_callback(self, event):
ActionSyslog('+++ CALLBACK: ' + event)
self.logger.setLevel(INFO)
self.logger.info('System CPU Utilization Poll Interval exceeds configured
threshold!')
ActionSyslog('System CPU Utilization Poll Interval exceeds configured
threshold!')
#Set policy status to CRITICAL
self.set_alert_level(Status.CRITICAL)
#ActionCLI("top cpu")
#ActionCLI("show copp statistics")
self.logger.info('### Callback executed')
```

In the above script, the "sum over time" is configured to be an aggregation of data values for over five (5) minutes, where the data values include a central processing unit (CPU) utilization poll indicating a number of CPUs active at any given point in time. The summarization condition for extracting the data is to select, within the 5 minutes of data values (e.g., 5 mins×12 data points/min=60 data points, when the system collects data every 5 secs.) the maximum value (e.g., the maximum number of CPU used during the 5 minute time interval).

Architecture 200 also illustrates a configuration and state database 252A, and a time series database 252B (hereinafter, collectively referred to as "databases 252") storing data values for one or more resources 240 of network device 130, as collected by agents 244. Databases 252 may be communicatively coupled with network device 130 (e.g., through network 150, through each other, or separately). Network analysis engine 242 includes multiple agents 244 configured to perform tests and collect data from network device 130 and evaluate its performance. Agents 244 are configured by users (e.g., network administrators using client devices 110) via scripts 246. Scripts 246 may include calls and references to multiple configuration parameters 248. Scripts 246 may be configured to monitor databases 252 based on uniform resource locator (URL) patterns including wildcards and ranges. The resulting time series data may include a mix of different data types and metrics. Embodiments as disclosed herein may include a smart summarization and aggregation of raw data, without losing the qualitative features of the raw data (e.g. important spikes, variations, transitions in the time series data) to avoid a performance bottleneck of processing excessively large raw time series data. In other words, the aggregated and summarized set of time series data maintains a set of key qualitative features of the raw time series data but a lesser quantity of the data compared to the original raw time series data.

Figure 3:
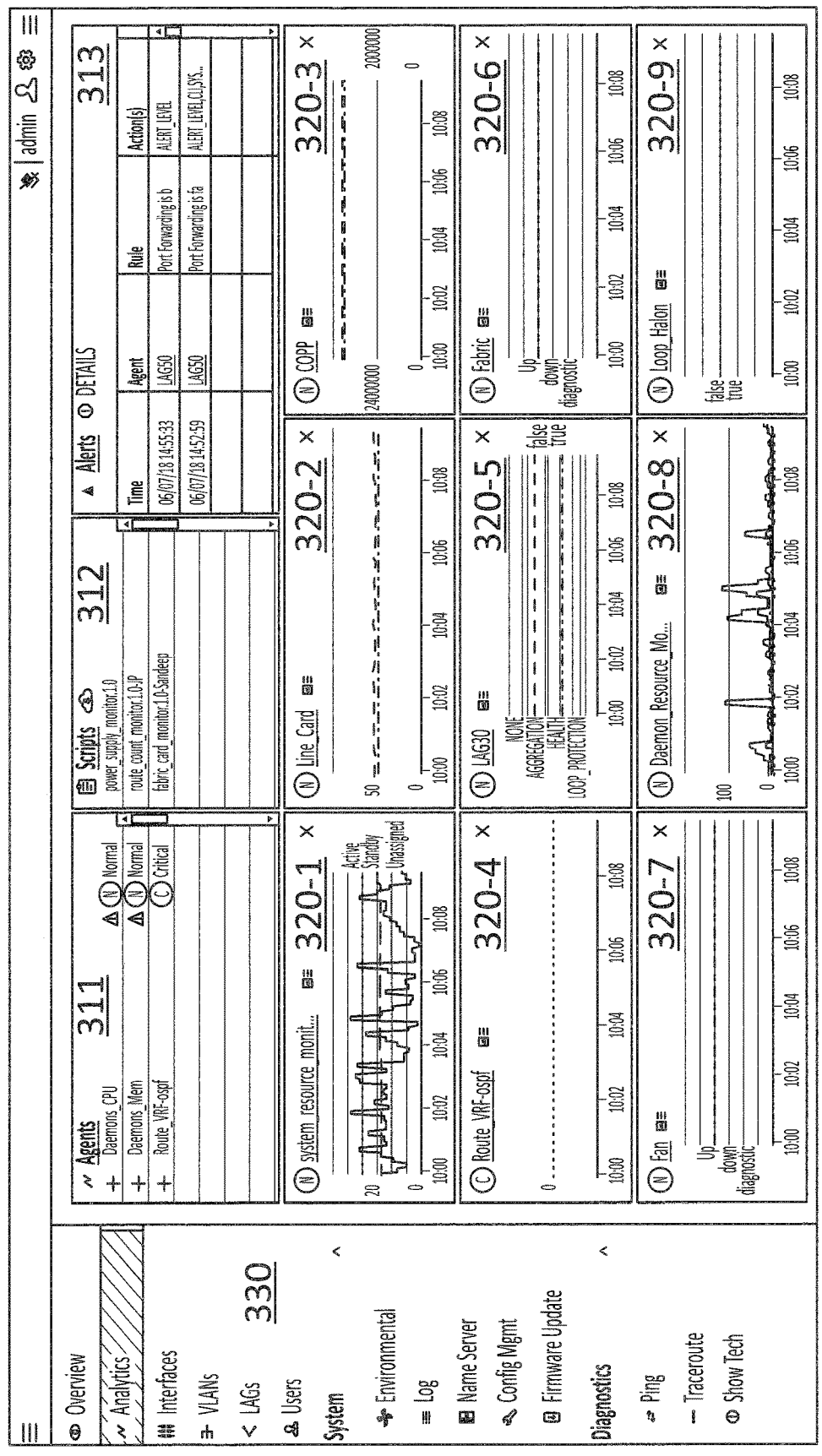
FIG. 3 illustrates a dashboard for a network analytics engine, according to some embodiments.

FIG. 3 illustrates a dashboard 300 for a network analysis engine (e.g., network analysis engine 242), according to some embodiments. Dashboard 300 may be accessed by a network administrator to determine the behavior and performance of a network device. The network administrator may access dashboard 300 remotely, through an application installed in a client device and communicating with the network device (e.g., application 222 and client device 110). Dashboard 300 may include an agent field 311, a script field 312, and an alert field 313. Agent field 311 includes a list of agents created and available to monitor network device 130. Some of the agents may be enabled, and some of the agents may be disabled. Script field 312 includes, for each of the agents in agent field 311, a text editor including the commands and instructions governing the respective agent. Alerts field 313 includes a log of alerts issued by each of the agents in agent field 311, based on the monitors and rules configured for the respective agent in the respective scripts and according to the class constructor. Alerts field 313 includes a time-stamp for the alert, and a brief description of an error condition, a fault, or a rule violation in the agent that issued the alert. Dashboard 300 may also include a menu field 330 that contains tabs and options for the network administrator.

Dashboard 300 also include agent displays 320-1, 320-2, 320-3, 320-4, 320-5, 320-6, 320-7, 320-8, and 320-9 (hereinafter, collectively referred to as "agent displays 320"), indicating graphic displays of the values of the different monitors set by each of a group of agents selected by the network administrator, over time. More specifically, but without loss of generality and for illustration purposes only, agent display 320-1 may indicate whether a system resource (e.g., an input/output port) is "active," on "standby," or "unassigned." Likewise, agent display 320-2 may indicate a statistics value of packet traffic through the network device. Agent display 320-3 may indicate a number of resources of a selected class available to the network device at any given time. Agent display 320-4 may indicate a fan speed of network device 130. Agent displays 320-5 and 320-8 may indicate the state ("up" or "down") of a resource (e.g., a network interface circuit—NIC—on an input/output port). Agent displays 320-6 and 320-7 may indicate the state of software resources of the network device. Agent display 320-9 may indicate a fan speed transition for the network device.

Figure 4:
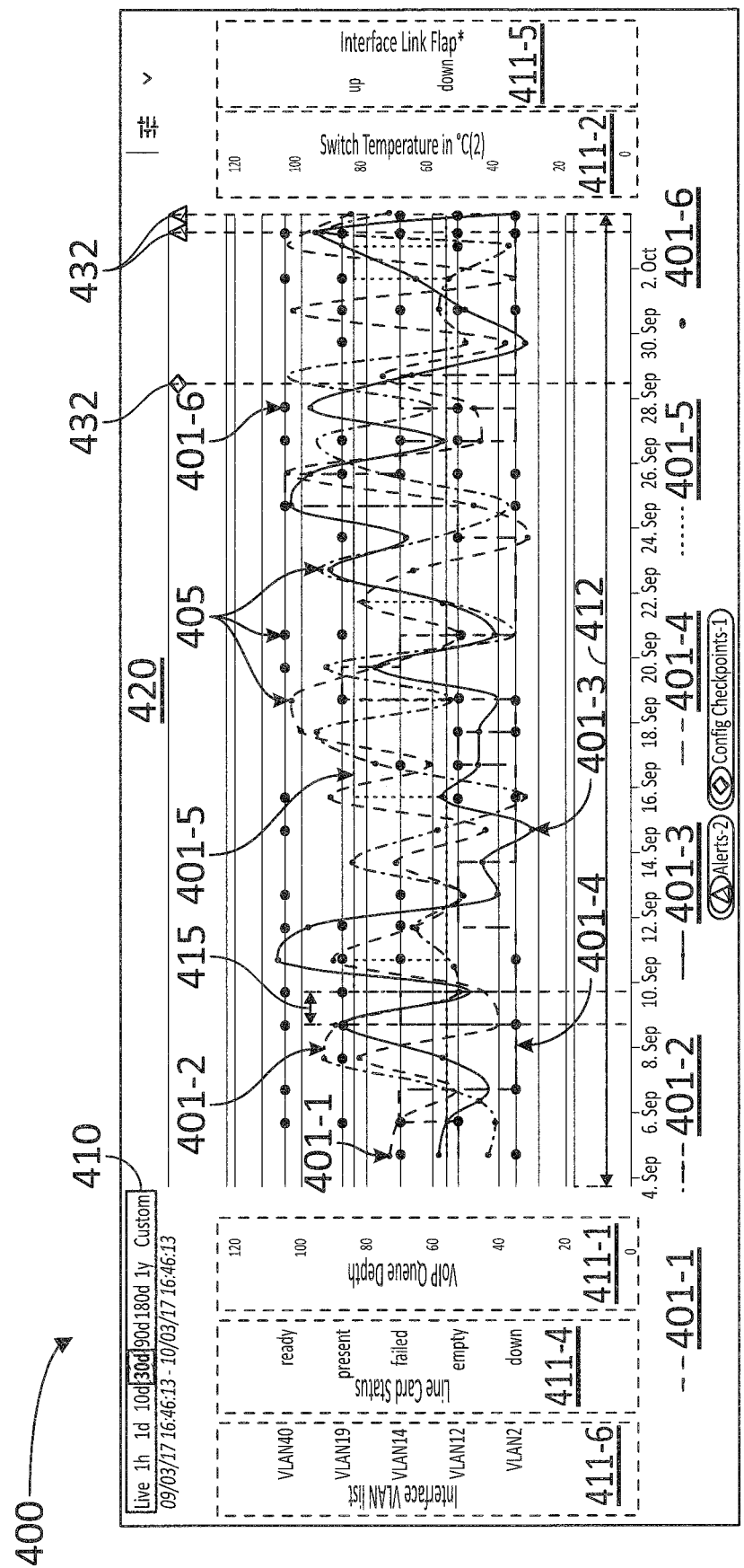
FIG. 4 illustrates a time series graph for an agent selected from the dashboard in FIG. 3, according to some embodiments.

FIG. 4 illustrates a time series graph 400 for an agent 420 selected from the dashboard in FIG. 3, according to some embodiments. In some embodiments, a network administrator can access time series graph 400 remotely, using an application installed in a client device (e.g. application 222 and client device 130). The abscissae in graph 400 indicates time, and the ordinates indicate different resource values 411-1, 411-2, 411-4, 411-5, and 411-6 (hereinafter, collectively referred to as "resource values 411") for different resource curves 401-1, 401-2, 401-3, 401-4, 401-5, and 401-6 (hereinafter, collectively referred to as "resource curves 401"). Resource values 411 may include, without limitation and for illustrative purposes only, a value 411-1 for a voice over Internet Protocol (VoIP) queue depth curve 401-1, a value 411-2 (e.g., temperature) for a first device temperature curve 401-2 and for a second device temperature curve 401-3, a value 411-4 for a line card status curve 401-4, a value 411-5 for an interface link flap curve 401-5, and a value 411-6 for an interface virtual local area network (VLAN) list curve 401-6. In some embodiments, first device temperature curve 401-2 and second device temperature curve 401-3 may include a minimum device temperature or a maximum device temperature (e.g., aggregated over an arbitrary period of time).

The abscissae in graph 400 may include a time period 412 selected by the network administrator from a zoom field 410 to monitor and analyze the behavior of the network device. Resource curves 401 include data points 405 which are aggregated over an interval 415. Resource curves 401 also include flags and alert indicators 432, for data points 405 that may be indicative of a relevant network event. Interval 415 is selected by the application in the client device or by the network device hosting the application, such that resource curves 401 include a number of data points 405 within the limit of a network service request between the client device and the network device. Moreover, a data aggregation for data points 405 may include a constraint that reduces the number of data values (e.g., as originally stored in time series database 252B) within interval 415 to a single data point 405 such that at least a qualitative feature of the time series data is preserved, regardless of the time span in time period 412. A qualitative feature of the time series data may include any relevant flags or alerts 432 displayed in graph 400, indicating a relevant network event that a network administrator desired to keep track of, over different time periods 412.

In some embodiments, an agent may include eight (8) monitors of which all eight are monitoring wildcard uniform resource identifiers (URIs). A wildcard URI may include multiple resources including individual time series in themselves. For each monitor (e.g., wildcard URI) the network device may collect a data point every 5 seconds. Accordingly, for each monitor some embodiments may include data displays for different number of data points depending on the selected period of time:

| Time | Number of Data Points |
| --- | --- |
| 1 day | 17,280 |
| 1 week | 120,960 |
| 1 month | 525,601 |
| 3 months | 1,576,802 |
| 6 months | 3,153,600 |
| 1 year | 6,307,200 |

Accordingly, for a single monitor, for 1 year, time series database 252B may include over 6.3 million data points. For the eight (8) different monitors, a total of over 50.45 million data points will be generated. Plotting a meaningful chart with 50.45 million data points is a difficult task, even if the graph will be cluttered with such a large set of data points, the graph will be of little practical values even when presented on large screens, because it is difficult for a network administrator or other graph viewers to extract qualitative features from such large set of graphed data points. Among this large set of data points, this embodiment describes a summarization algorithm which smartly understands the intention of the URI being monitored, also takes into account the type of URI and gets the related aggregate function from the monitor. The algorithm then figures out the appropriate resolution (step size) based on the time interval the user is trying to view and applies necessary summarization and aggregation query techniques, some embodiments provide a significant reduction in the number of data points, which is as small as 0.01% of 50.45 million data points. This algorithm not only reduces the number of data points based on the time range but also provides meaningful data for each interval instead of just plotting random and raw data.

Figure 5A:
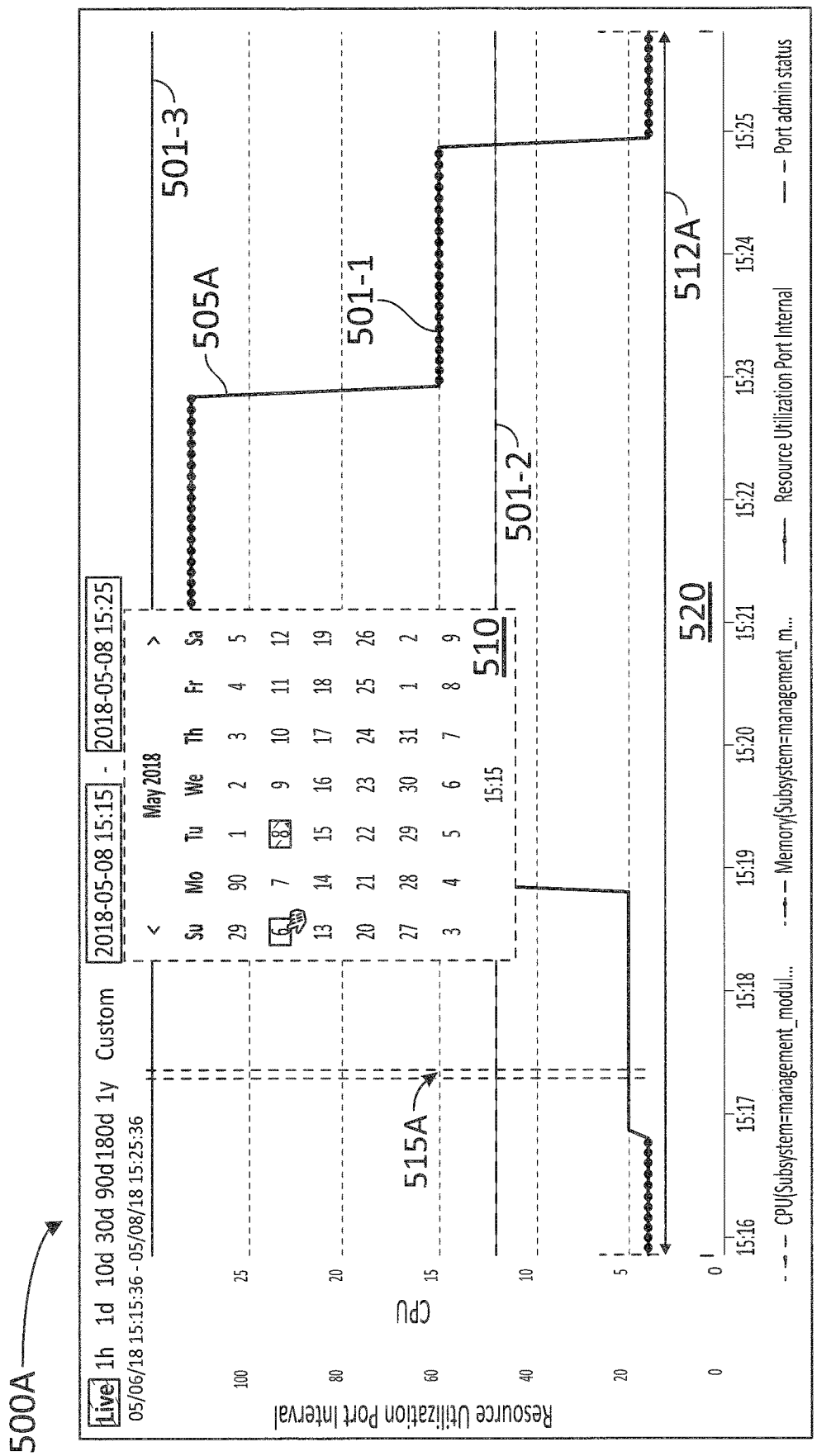
FIGS. 5A-B illustrate a time series graph with different zoom intervals, according to some embodiments.
Figure 5B:
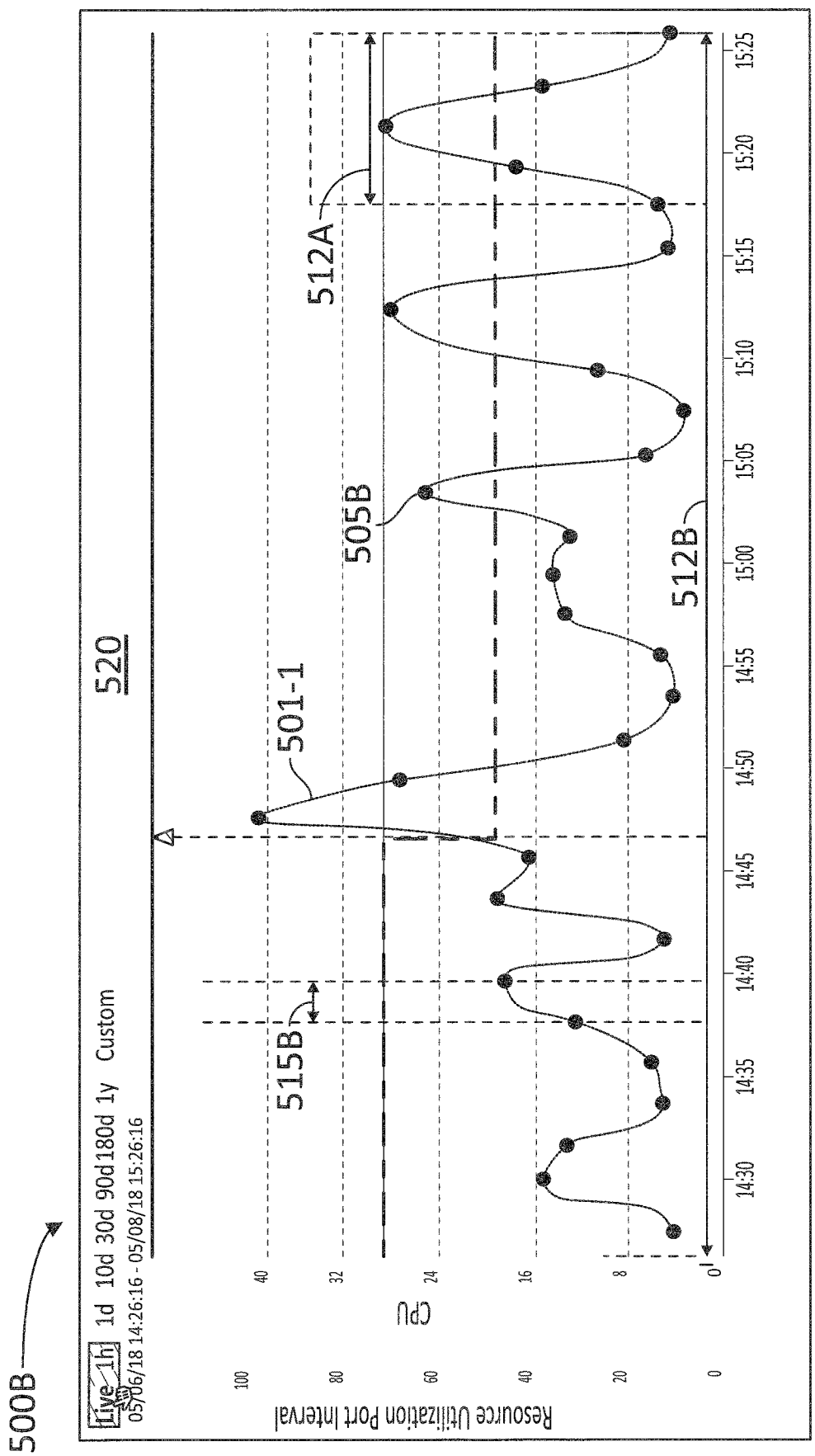

FIGS. 5A-B illustrate a time series graphs 500A and 500B for an agent 520 with different zoom over time intervals 512A and 512B, according to some embodiments. For exemplary purposes only, time interval 512A may be shorter than time interval 512B. Agent 520 may include resource values 501-1 (e.g., computer processor unit—CPU—usage), 501-2 (port status), and 501-3 (resource utilization poll).

In some embodiments, the time series analysis identifies patterns in correlated data. Accordingly, some embodiments identify trends and seasonal variations in a diversified network environment. Thus, the zoom-in capability of the present disclosure provides a reliable tool to identify correlations, trends and patterns in the data from the network device.

Some embodiments also provide the ability to drill down to any point in time over the previous 365 days to observe time series data. Relevant network events such as configuration changes or any alerts which took place on the switch are preserved and accurately carried over through any zooming period of time. In some embodiments, when there is a large amount of data, embodiments as disclosed herein execute summarization steps to provide a network rich data set with reduced resolution making it easy for network operators/administrators to understand the core nature of the metrics.

FIG. 5A illustrates graph 500A wherein curve 501-1 includes data points 505A collected over interval 515A. While resource values 501-2 and 501-3 show little to no change during time interval 512A, resource value 501-1 certainly has a more complex behavior, which a network administrator may desire to analyze in detail. In some embodiments, time interval 512A may be selected from a pull down menu 510 including dates that the network administrator may select at will.

FIG. 5B illustrates graph 500B with a zoom out view of FIG. 5A, including a longer period of time 512B than period of time 512A. While curve 501-1 includes fewer data points 505B, graph 500B preserves the key qualitative features of the relevant events in graph 500A.

Figure 6:
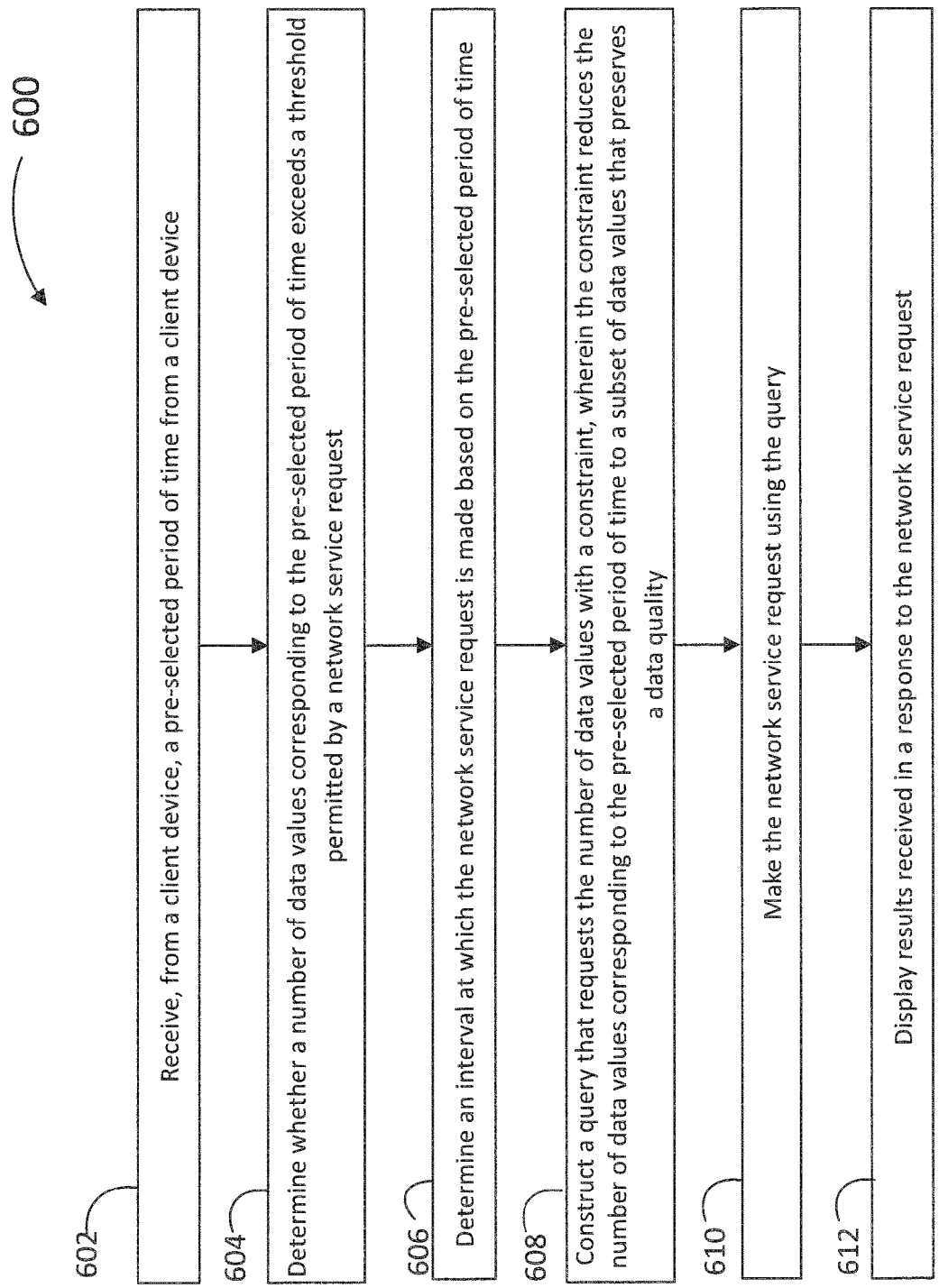
FIG. 6 is a flow chart illustrating steps in a method for providing a time series data with a selected zoom interval, according to some embodiments.

FIG. 6 is a flow chart illustrating steps in a method 600 for displaying time series data with adaptable zoom intervals, according to some embodiments. Method 600 may be performed at least partially by any one of multiple network devices, while communicating with any one of a plurality of client devices (e.g., any one of network devices 130 and any one of client devices 110). The network device may be hosting a network analysis engine configured to perform at least a portion of an application installed in a client device (e.g., application 222). The client devices may be handled by a user, wherein the user may be an administrator of network 150. At least some of the steps in method 600 may be performed by a computer having a processor executing commands stored in a memory of the computer (e.g., processors 212 and 236, memories 220 and 232). Further, steps as disclosed in method 600 may include retrieving, editing, and/or storing files in a database that is part of, or is communicably coupled to, the computer, using, inter alia, a network analysis engine (e.g., network analysis engine 242). The database may include any one of a configuration and state database, and a time series database (e.g., configuration and state database 252A and time series database 252B). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes receiving, from the client device, a pre-selected period of time. In some embodiments, step 602 includes selecting, within the pre-selected period of time, a second period of time, and determining a second interval for the network service request to include the data values. In some embodiments, step 602 includes correlating multiple data values from multiple queries over the pre-selected period of time to identify a network event.

Step 604 includes determining whether a number of data values corresponding to the pre-selected period of time exceeds a threshold permitted by a network service request.

Step 606 includes determining an interval at which the network service request is made, based on the pre-selected period of time.

Step 608 includes constructing a query that requests a number of data values with a constraint, wherein the constraint reduces the number of data values corresponding to the pre-selected period of time to a subset of data values that preserves a data quality. In some embodiments, step 608 includes requesting a first data value for a first network device characteristic and requesting a second data value for a second network device characteristic.

In some embodiments, step 608 includes selecting the constraint from an aggregated value of the data values within the interval, wherein the aggregated value comprises one of an average of the data values, a minimum value, and a maximum value.

Step 610 includes making the network service request using the query. In some embodiments, the data values are indicative of a usage of a resource in a network device, and step 610 includes querying the network device for the usage of the resource with an agent running a script that is configured by the client device.

Step 612 includes displaying the results received in a response to the network service request. In some embodiments, step 612 includes identifying a network event based on the data values, and selecting a second period of time that comprises the pre-selected period of time such that at least a second network event is identified within the second period of time. Further, in some embodiments, step 612 includes finding a correlation between the network event and the second network event. In some embodiments, step 612 includes issuing an alert to display in the client device when the subset of data values indicates a drop in quality of service for a network device. In some embodiments, step 612 includes allowing a user from the client device to navigate through the results received in the response to the network service request, and providing a selected portion of the results to the client device. In some embodiments, step 612 includes displaying a configuration checkpoint within the results, the configuration checkpoint indicative of a test result of a configuration of a network device for a selected data value.

Figure 7:
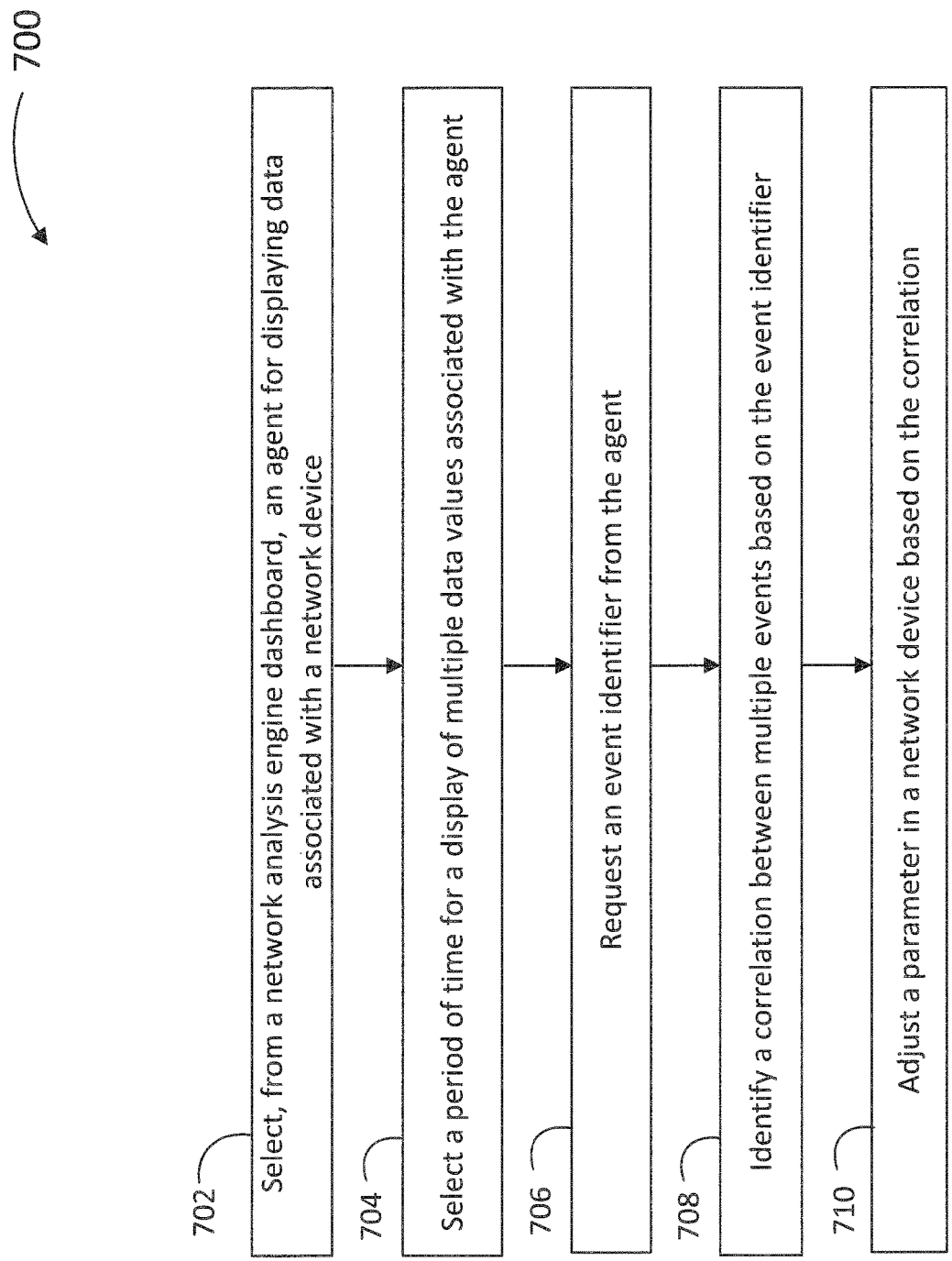
FIG. 7 is a flow chart illustrating steps in a method for displaying a time series data with a selected zoom interval, according to some embodiments.

FIG. 7 is a flow chart illustrating steps in a method 700 for displaying a time series data with a selected zoom interval, according to some embodiments. Method 700 may be performed at least partially by any one of multiple network devices, while communicating with any one of a plurality of client devices (e.g., any one of network devices 130 and any one of client devices 110). The network device may be hosting a network analysis engine configured to perform at least a portion of an application installed in at least one of the client devices (e.g., application 222). The client devices may be handled by a user, wherein the user may be an administrator of network 150. At least some of the steps in method 700 may be performed by a computer having a processor executing commands stored in a memory of the computer (e.g., processors 212 and 236, memories 220 and 232). Further, steps as disclosed in method 700 may include retrieving, editing, and/or storing files in a database that is part of, or is communicably coupled to, the computer, using, inter alia, a network analysis engine (e.g., network analysis engine 242). The database may include any one of a configuration and state database, and a time series database (e.g., configuration and state database 252A and time series database 252B). Methods consistent with the present disclosure may include at least some, but not all, of the steps illustrated in method 700, performed in a different sequence. Furthermore, methods consistent with the present disclosure may include at least two or more steps as in method 700 performed overlapping in time, or almost simultaneously.

Step 702 includes selecting, from a network analysis engine dashboard, an agent for displaying data associated with a network device. In some embodiments, step 702 includes selecting a second period of time that comprises the first period of time such that at least two events are displayed.

Step 704 includes selecting a period of time for a display of multiple data values associated with the agent. In some embodiments, step 704 includes enabling an agent to collect the data values from the network device.

Step 706 includes requesting an event identifier from the agent. In some embodiments, step 706 includes modifying a script for an agent to collect the data values from the network device.

Step 708 includes identifying a correlation between multiple events based on the event identifier.

Step 710 includes adjusting a parameter in the network device based on the correlation.

Hardware Overview

Figure 8:
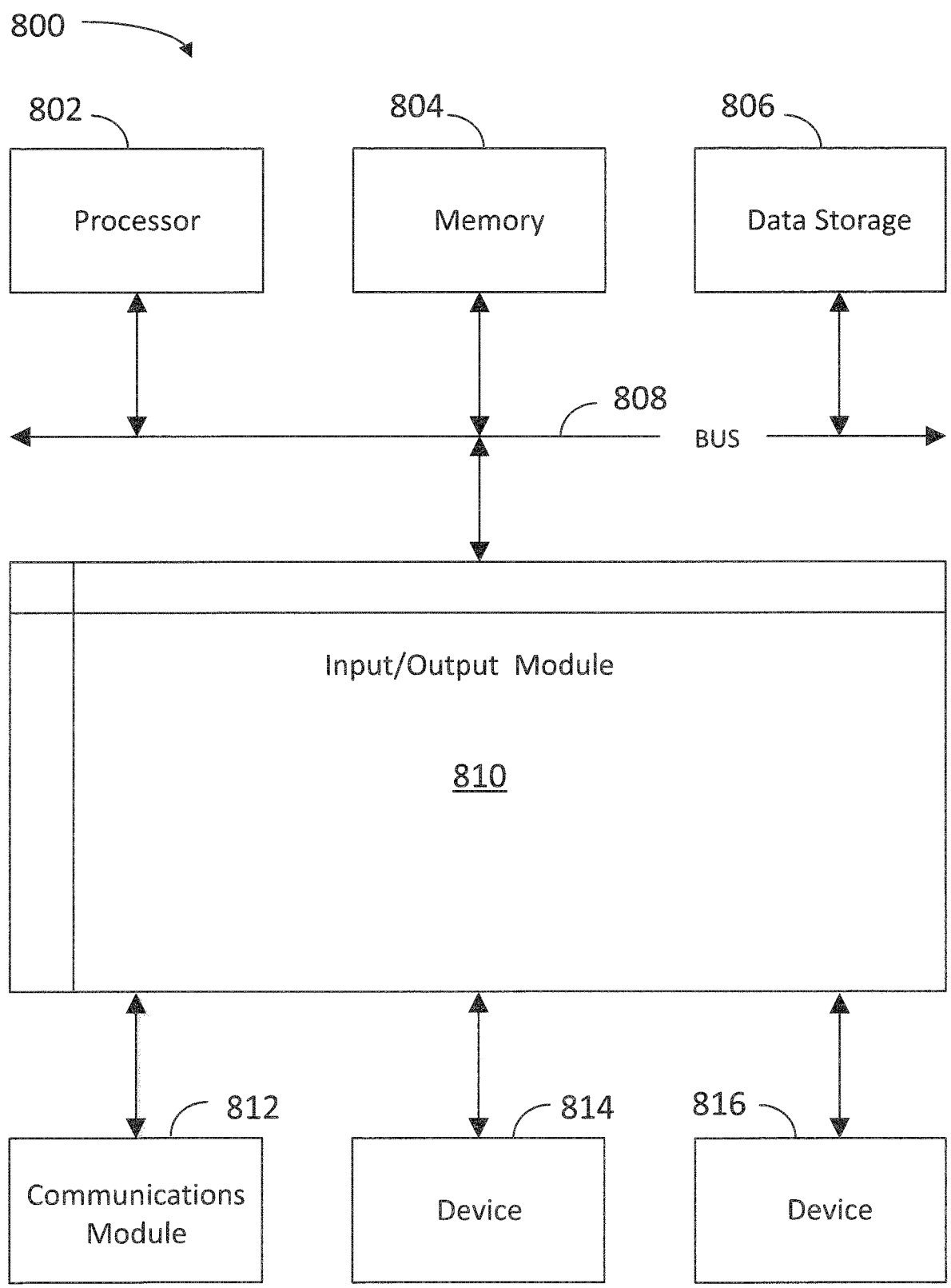
FIG. 8 is a block diagram illustrating an example computer system with which the client and network device of FIGS. 1 and 2 and the methods of FIGS. 6 and 7 can be implemented.

FIG. 8 is a block diagram illustrating an exemplary computer system 800 with which the client device 110 and network device 130 of FIGS. 1 and 2, and the methods of FIGS. 6 and 7 can be implemented. In certain aspects, the computer system 800 may be implemented using hardware or a combination of software and hardware, either in a dedicated network device, or integrated into another entity, or distributed across multiple entities.

Computer system 800 (e.g., client device 110 and network device 130) includes a bus 808 or other communication mechanism for communicating information, and a processor 802 (e.g., processors 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, e.g., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage hardware component 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, the client device 110 and network device 130 can be implemented using a computer system 800 in response to processor 802 executing one or more sequences of one or more instructions contained in memory 804. Such instructions may be read into memory 804 from another machine-readable medium, such as data storage hardware component 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data network device, or that includes a middleware component, e.g., an application network device, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and network devices. A client and network device are generally remote from each other and typically interact through a communication network. The relationship of client and network device arises by virtue of computer programs running on the respective computers and having a client-network device relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage hardware component 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method comprising:
   receiving, from a client device, a pre-selected period of time;
   determining whether multiple data values corresponding to the pre-selected period of time exceeds a threshold permitted by a network service request;
   determining an interval at which the network service request is made based on the pre-selected period of time;
   constructing a query that requests the data values with a constraint, wherein the constraint reduces the data values corresponding to the pre-selected period of time to a subset of data values that preserve a data quality;
   making the network service request using the query; and
   displaying results received in a response to the network service request.

2. The computer-implemented method of claim 1, wherein constructing a query that requests the data values with a constraint comprises requesting a first data value for a first network device characteristic and requesting a second data value for a second network device characteristic.

3. The computer-implemented method of claim 1 further comprising selecting the constraint from an aggregated value of the data values within the interval, wherein the aggregated value comprises one of an average of the data values, a minimum value, and a maximum value.

4. The computer-implemented method of claim 1, further comprising selecting, within the pre-selected period of time, a second period of time, and determining a second interval for the network service request to include the data values.

5. The computer-implemented method of claim 1, further comprising correlating multiple data values from multiple queries over the pre-selected period of time to identify a network event.

6. The computer-implemented method of claim 1, wherein the data values are indicative of a usage of a resource in a network device, the method further comprising querying the network device for the usage of the resource with an agent running a script that is configured by the client device.

7. The computer-implemented method of claim 1, further comprising:
   identifying a network event based on the data values, and selecting a second period of time that comprises the pre-selected period of time such that at least a second network event is identified within the second period of time; and
   finding a correlation between the network event and the second network event.

8. The computer-implemented method of claim 1, further comprising issuing an alert to display in the client device when the subset of data values indicates a drop in quality of service for a network device.

9. The computer-implemented method of claim 1, further comprising allowing a user from the client device to navigate through the results received in the response to the network service request, and providing a selected portion of the results to the client device.

10. The computer-implemented method of claim 1, further comprising displaying a configuration checkpoint within the results, the configuration checkpoint indicative of a test result of a configuration of a network device for a selected data value.

11. A system, comprising:
    a memory storing instructions; and
    one or more processors configured to execute the instructions to:
    receive, from a client device, a pre-selected period of time;
    determine whether multiple data values corresponding to the pre-selected period of time exceeds a threshold permitted by a network service request;
    determine an interval at which the network service request is made based on the pre-selected period of time;
    construct a query that requests the data values with a constraint, wherein the constraint reduces the data values corresponding to the pre-selected period of time to a subset of data values that preserve a data quality;
    make the network service request using the query; and
    display results received in a response to the network service request.

12. The system of claim 11, wherein the one or more processors is further configured to execute instructions to select the constraint from an aggregated value of the data values within the interval, wherein the aggregated value comprises one of an average of the data values, a minimum value, and a maximum value.

13. The system of claim 11, wherein the one or more processors is further configured to execute instructions to select, within the pre-selected period of time, a second period of time, and to determine a second interval for the network service request to include the data values.

14. The system of claim 11, wherein the one or more processors is further configured to execute instructions to correlate multiple data values from multiple queries over the pre-selected period of time to identify a network event.

15. The system of claim 11, wherein the data values are indicative of a usage of a resource in a network device, and the one or more processors is further configured to query the network device for the usage of the resource with an agent running a script that is configured by the client device.

16. The system of claim 11, wherein the one or more processors is further configured to:
- identify a network event based on the data values, and selecting a second period of time that comprises the pre-selected period of time such that at least a second network event is identified within the second period of time; and
- find a correlation between the network event and the second network event.

* * * * *